L. DAUTREBANDE.
TREATMENT OF BEET ROOTS.
APPLICATION FILED JUNE 21, 1909.
1,067,976.
Patented July 22, 1913.
2 SHEETS—SHEET 1.
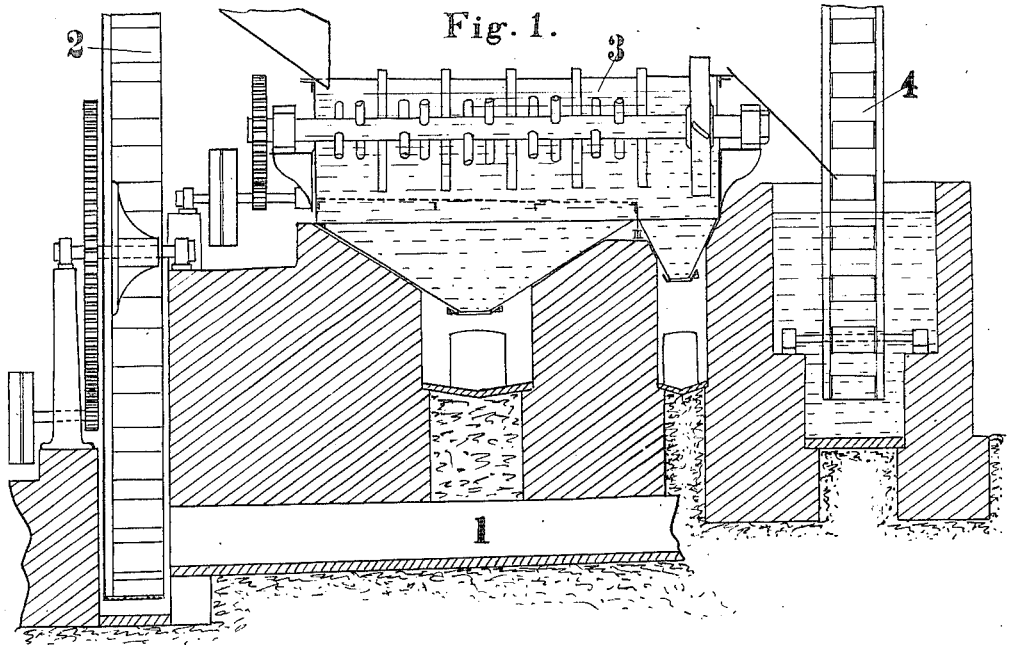
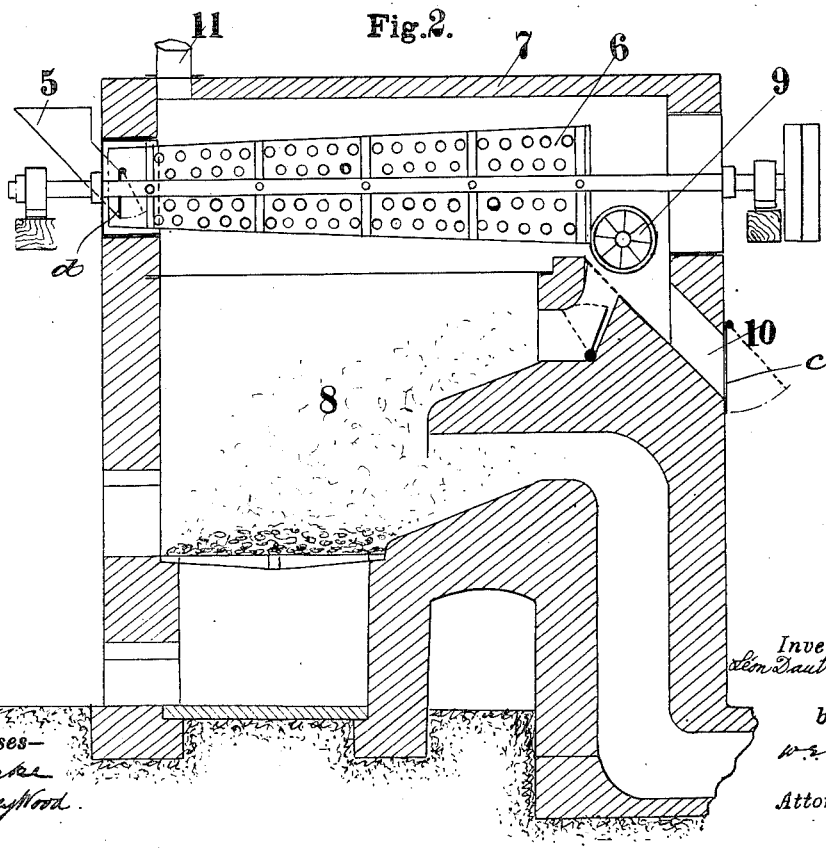

L. DAUTREBANDE.
TREATMENT OF BEET ROOTS.
APPLICATION FILED JUNE 21, 1909.

1,067,976.

Patented July 22, 1913.

2 SHEETS—SHEET 2.

Witnesses—

Inventor
Léon Dautrebande
by
Attorney.

UNITED STATES PATENT OFFICE.

LÉON DAUTREBANDE, OF DAUSSOULX, BELGIUM.

TREATMENT OF BEET-ROOTS.

1,067,976.

Specification of Letters Patent.  Patented July 22, 1913.

Application filed June 21, 1909. Serial No. 503,355.

*To all whom it may concern:*

Be it known that I, LÉON DAUTREBANDE, brewer, a subject of the King of Belgium, residing at Daussoulx, Belgium, have invented certain new and useful Improvements in and Relating to the Treatment of Beet-Roots, of which the following is a specification.

Several processes have been proposed and certain patents have been obtained, which have for their object to change the beet-root and its wastes into a more or less dry product by expelling the excess of water which it contains. The product, however, thus obtained from the beet-root contains the substances which are valueless from the nutritive point of view and therefore leaves much to be desired with regard to its value as a food; moreover its powers of preservation are very limited owing to its great hygroscopic qualities so that it cannot be used universally.

In the present process the skin is separated from the flesh of the beet-root and at the same time the final product receives good qualities of preservation and a perfect friability.

The process is carried out in practice as follows and by means of the apparatus illustrated in the accompanying drawings in which—

Figure 3:
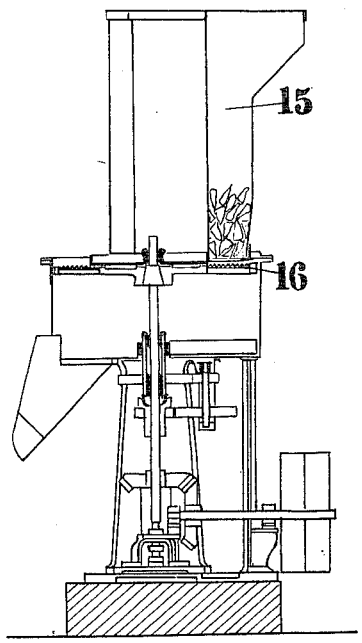
Figure 4:
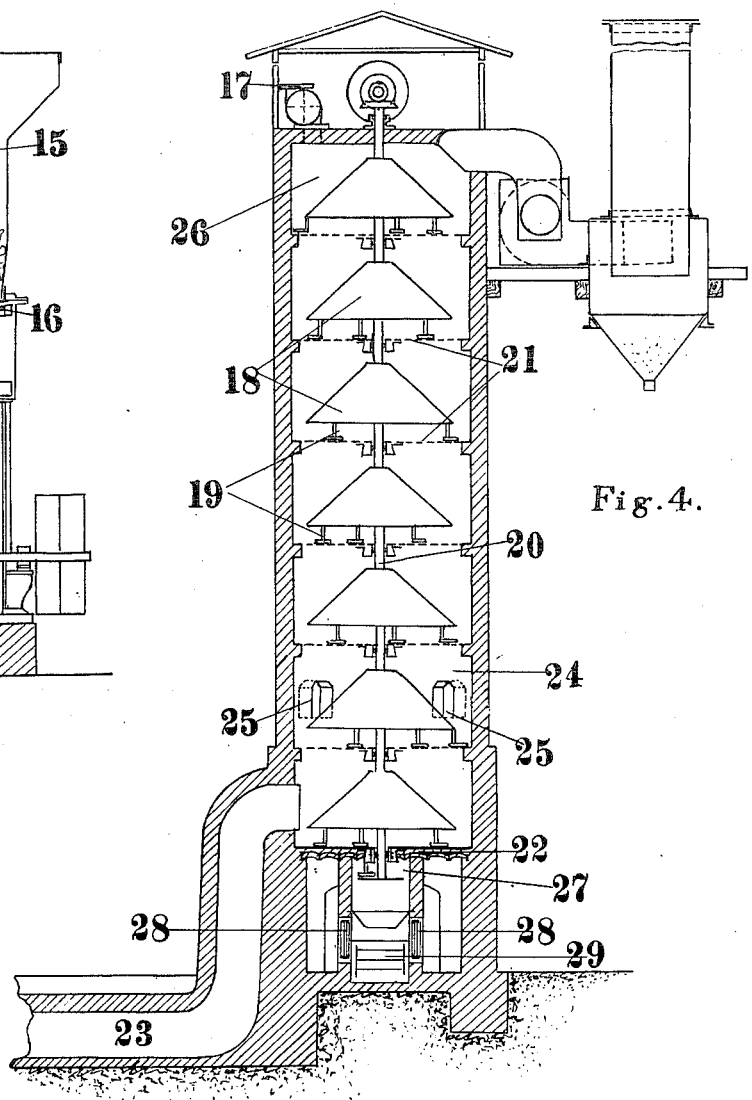

Figure 1 is a cross section of the washing apparatus. Fig. 2 is a cross-section of the apparatus for drying the beetroots while whole. Fig. 3 shows the cutting mechanism, and Fig. 4 shows the drying apparatus.

The freshly gathered beetroots or those left in bins for a while are passed along a channel 1 filled with water out of which they are raised by a wheel 2 or other elevator and discharged into the washing machine 3 in which the beetroots are thoroughly washed. From here the beetroots are conducted by an elevator 4 and discharged into a hopper 5 by means of which the beetroots are charged into the drying apparatus (Fig. 2). The apparatus for drying the beetroots consists of a conical perforated drum 6 (shown in detail in Fig. 2) inclosed in a brick-work chamber 7 which is in direct communication with a furnace or hot air chamber 8. The beetroots enter the narrow end of the conical drum 6 through the hopper 5 and the hot air or gases from the furnace 8 are brought into contact with the beetroots which are moved slowly forward on the rotation of the drum 6. The current of hot air or gases is controlled by a fan or the like 9 and the temperature is controlled by the admission of cold air admitted through registers provided in the walls of the chamber 7. The entrance for the beetroots into the drum 6 as well as the exit 10 from the chamber 7 are respectively controlled by dampers $d$ and $c$ of sheet iron or the like. In this manner the very thin skin which is of a different composition and contains less water than the flesh of the beetroot, offers the whole extent of its surface to the drying action of this high temperature, and is deprived almost instantaneously of the greater portion of its moisture, while the steam produced from the particles of water nearest the inner surface, causes the skin to swell and on the escape of the steam to split and separate from the flesh. The broken skin then curls and shrinks up, and only partially adheres to the flesh. The gases from the chamber 7 escape through the outlet 11. The beetroots thus treated are passed into a chamber 15 Fig. 4 in which they are cut into regular slices, by a rotary cutter 16 and are then dried slowly in a temperature which begins at about 50° C. and finishes at 110° C. This apparatus is of the Huillard system and the slices are admitted at 17 and passed over a number of cones 18 provided with scrapers 19. These cones 18 are mounted on a vertical shaft 20 which is rotated by any suitable means and are provided, with the exception of the lowermost cone, above perforated plates 21. The plate 22 of the lowermost cone is mounted on masonry. The chamber between the lowermost perforated plate 21 and the plate 22 communicates with a channel 23 which conducts the hot gases. In the chamber 24 are provided registers 25 for the admission of air. The uppermost chamber 26 of the apparatus is connected at one side to a suction fan. The desiccating action is ended when the slices contain 4% moisture. This desiccating action is, practically speaking, completed on the plate above the chamber 24. The slices are then submitted to a cooling action by exposing them to a dry current of natural or artificial cooled air. For this purpose the slices from the lower chamber of the drying apparatus are charged into a chamber 27. At the lower ends of the walls of this chamber 27 are provided radiators 28 which are fed by a cold liquid coming from a freezing machine or from any other suitable cold producing means. The chamber 27 is also in communication with a suction device which acts in the direction of movement of the conveyer 29 for the cooled product. This produces the following effect: The substance of the beetroot having increased in volume with the increase of temperature, contracts when suddenly cooled and this causes the last particles of the skin which still adhere to the flesh, to be detached in the first case and secondly, compresses the cells and expels the excess of air, which has been introduced during the desiccating process thus giving to the final product the maximum possible density, reducing in a large degree the porosity of the product, and avoiding the danger, inherent in the hygroscopic state, in which it exists before this last operation. In this manner a substance is obtained which keeps indefinitely, and is perfectly friable. The pieces of skin still contained in the mass of the dried slices are separated by mechanical sifting and the product, consisting exclusively of the flesh of the beetroots, is obtained in an absolutely pure state, ready for the different purposes, for which it is intended. The peel may be utilized by extracting from it, potash, cellulose and other mineral substances.

What I claim as my invention and desire to secure by Letters Patent is:—

1. A process of treating beetroots consisting in washing the beetroots, separating the skin from the flesh of the beetroots, so that it only partially adheres to the latter, cutting the flesh into slices, subjecting the slices to a desiccating process and then rapidly cooling the slices for the removal of the adherent portions of the skin.

2. A process of treating beetroots consisting in washing the beetroots, drying the beetroots at a high temperature, for the purpose of causing the skin to swell, split, separate from the flesh and curl so that the skin only partially adheres to the flesh of the beetroot, cutting the flesh into slices subjecting the slices to a desiccating process and then rapidly cooling the slices for the removal of the adherent portions of the skin.

3. A process of treating beetroots consisting in washing the beetroots, drying the beetroots at a high temperature, so that the skin swells, splits, separates from the skin and curls, and thus only partially adheres to the flesh of the beetroots, cutting the beetroots into slices, gradually heating the slices from a low temperature to a high temperature, then rapidly cooling the slices to produce a dense product and removing the adherent portions of the skin.

In testimony whereof I have hereunto signed my name in the presence of two subscribing witnesses.

LÉON DAUTREBANDE.

Witnesses:
FILVERNERT,
JAMES McG. FAY.